(12) United States Patent
Celik et al.

(10) Patent No.: US 6,895,101 B2
(45) Date of Patent: May 17, 2005

(54) SYSTEM AND METHOD FOR EMBEDDING INFORMATION IN DIGITAL SIGNALS

(75) Inventors: Mehmet Utku Celik, Rochester, NY (US); Gaurav Sharma, Webster, NY (US); Ahmet Murat Tekalp, Rochester, NY (US)

(73) Assignees: University of Rochester, Rochester, NY (US); Xerox Corporation, Stamford, CT (US)

( * ) Notice: Subject to any disclaimer, the term of this patent is extended or adjusted under 35 U.S.C. 154(b) by 0 days.

(21) Appl. No.: 10/608,542

(22) Filed: Jun. 30, 2003

(65) Prior Publication Data

US 2004/0001611 A1 Jan. 1, 2004

Related U.S. Application Data

(60) Provisional application No. 60/391,963, filed on Jun. 28, 2002.

(51) Int. Cl.[7] .................................................. G06K 9/00
(52) U.S. Cl. ........................ 382/100; 382/232; 382/233
(58) Field of Search ................................. 382/100, 232, 382/233, 244, 248, 251; 283/113, 901, 902; 358/3.28; 380/201; 386/94; 399/366; 348/460

(56) References Cited

U.S. PATENT DOCUMENTS

| | | | | |
|---|---|---|---|---|
| 5,966,465 A | * | 10/1999 | Keith et al. | 382/232 |
| 6,275,599 B1 | * | 8/2001 | Adler et al. | 382/100 |
| 6,278,791 B1 | * | 8/2001 | Honsinger et al. | 382/100 |
| 6,332,030 B1 | * | 12/2001 | Manjunath et al. | 382/100 |
| 6,456,726 B1 | * | 9/2002 | Yu et al. | 382/100 |
| 2003/0081809 A1 | * | 5/2003 | Fridrich et al. | 382/100 |
| 2003/0149879 A1 | * | 8/2003 | Tian et al. | 713/176 |

* cited by examiner

Primary Examiner—Daniel Mariam
(74) Attorney, Agent, or Firm—Blank Rome LLP

(57) ABSTRACT

A lossless, reversible data embedding technique uses a generalization of least-significant-bit modification. The portions of the signal that are susceptible to embedding distortion are compressed and sent as part of the embedded payload. A prediction-based conditional entropy coder uses unaltered portions of the host signal to improve lossless data capacity.

35 Claims, 7 Drawing Sheets

CAPACITY-DISTORTION PERFORMANCE IN LSB AND G-LSB

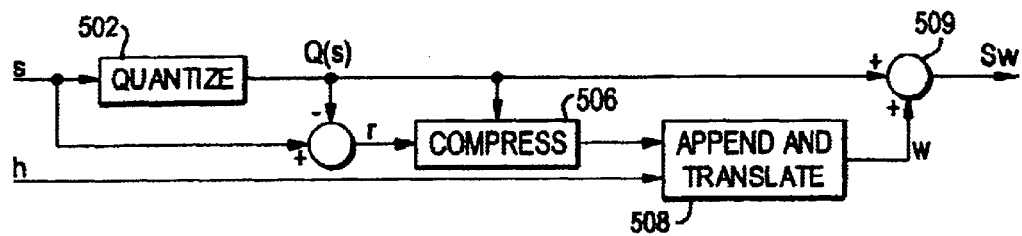
FIG. 5A
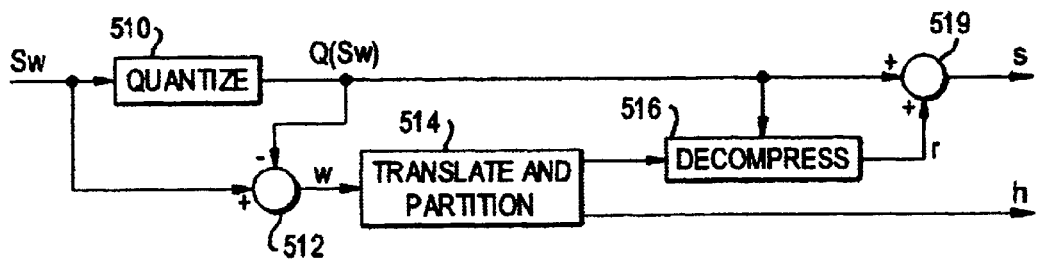
FIG. 5B
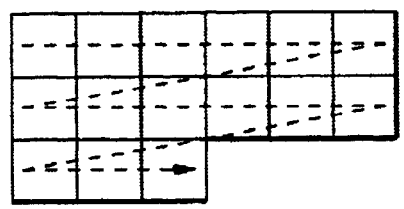
FIG. 6A
FIG. 6B

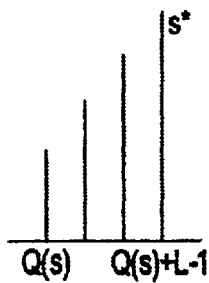
FIG. 8A
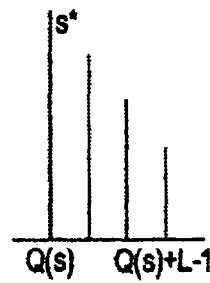
FIG. 8B
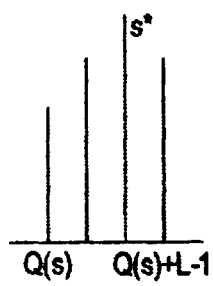
FIG. 8C
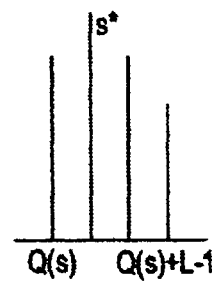
FIG. 8D
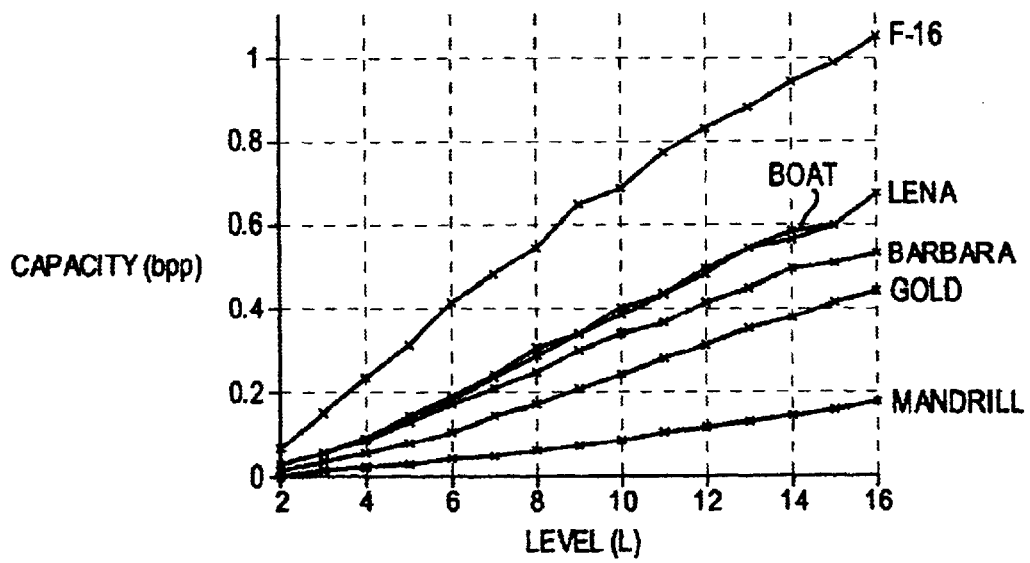
FIG. 11 LEVEL vs. CAPACITY

COMPARISON OF RS-EMBEDDING AND LOSSLESS G-LSB EMBEDDING

SYSTEM AND METHOD FOR EMBEDDING INFORMATION IN DIGITAL SIGNALS

REFERENCE TO RELATED APPLICATIONS

The present application claims the benefit of U.S. Provisional Patent Application No. 60/391,963, filed Jun. 28, 2002, whose disclosure is hereby incorporated by reference in its entirety into the present disclosure.

FIELD OF THE INVENTION

The present invention is directed to a system and method for embedding information in a digital signal, such as an image signal, and more particularly to such a system and method in which the loss of information is reduced or eliminated.

DESCRIPTION OF RELATED ART

Multimedia data embedding, or digital watermarking, refers to the process of inserting information bits into a host multimedia signal without introducing perceptible artifacts. A variety of embedding techniques, ranging from high-capacity bit modification to transform-domain spread spectrum methods, are used in various applications such as authentication, meta-data tagging, content-protection, and secret communications.

Most multimedia data embedding techniques modify, and hence distort, the host signal in order to insert the additional information. (Other techniques may encode this information into the "representation" of the signal, e.g. color-space.) The distortion induced on the host signal by the data embedding technique is called the embedding distortion. Often, the embedding distortion is small, yet irreversible, i.e. it cannot be removed to recover the original host signal. In many applications, the loss of host signal fidelity is not prohibitive as long as original and modified signals are perceptually equivalent. However, in a number of domains—such as military, legal and medical imaging—although some embedding distortion is admissible, permanent loss of signal fidelity is undesirable. This highlights the need for lossless data embedding techniques. These techniques, like their lossy counterparts, insert information bits by modifying the host signal, thus induce an embedding distortion. Nevertheless, they also enable the removal of such distortions and the exact-lossless-restoration of the original host signal after extraction of embedded information.

A general block diagram representing lossless data embedding schemes is seen in FIG. 1A, which shows encoding, and FIG. 1B, which shows decoding. The lossless embedding step shown in FIG. 1A as step 102 takes the host signal and the message data and produces a watermarked signal in which the message data is embedded. The data extraction and recovery process uses the watermarked signal to extract the embedded data and to recover the original host signal exactly, as shown in FIG. 1B as step 104. Note that though the recovery process allows reconstruction of the original host signal with no distortion, it is still desirable to keep the embedding distortion, i.e. the difference between the host and watermarked signal, to a minimum so that applications that do not have access to the extraction and recovery process do not incur a heavy penalty in image quality.

Lossless data embedding techniques may be classified into one of the following two categories: Type-I algorithms employ additive spread spectrum techniques, where a spread spectrum signal corresponding to the information payload is superimposed on the host in the embedding phase. At the decoder, detection of the embedded information is followed by a restoration step where the watermark signal is removed, i.e. subtracted, to restore the original host signal. Potential reversibility problems associated with the limited range of values in the digital representation of the host signal, e.g. overflows and underflows during addition and subtraction, are prevented by adopting modulo arithmetic for the watermark addition and subtraction. Due to their spread-spectrum nature, Type-I algorithms are robust with regard to the data embedding and allow for extraction of message data even if the host signal is perturbed (within reasonable limits) prior to detection. The original host signal, however, cannot be accurately recovered once the watermarked signal is perturbed. While the robustness is often desirable, modulo arithmetic typically produces disturbing salt-and-pepper artifacts in the watermarked signal compromising the desired goal of minimizing embedding distortion.

In Type-II algorithms, information bits are embedded by modifying, e.g. overwriting, selected features (portions) of the host signal-for instance least significant bits, high frequency wavelet coefficients. In this class of algorithms, the embedding function is irreversible. Recovery of the original host is achieved by compressing the original features and transmitting the compressed bit-stream as a part of the embedded payload. At the decoder, the embedded payload, including the compressed bit-stream, is extracted, and the original host signal is restored by replacing the modified features with the decompressed original features.

A general block diagram representing Type-II algorithms is seen in FIG. 2. A host signal is received, and features are extracted in step 202. The features are compressed in step 204 and modified in accordance with message data in step 206. The modified features are recombined into the host signal in step 208 to produce the watermarked signal.

In general, Type-II algorithms do not cause salt-and-pepper artifacts in the watermarked signal and can facilitate higher embedding capacities, albeit at the loss of the robustness of the first group.

BRIEF DESCRIPTION OF THE INVENTION

It is therefore an object of the invention to combine the advantages of type-I and type-II embedding. To achieve that and other objects, the present invention is directed to a high-capacity, low-distortion, Type-II lossless data embedding algorithm. First, we introduce a generalization of the well-known LSB (least significant bit) modification method as the underlying data embedding technique. This technique modifies the lowest levels, instead of bit planes, of the host signal to accommodate the payload information. This generalization has a finer capacity-distortion granularity. A lossless data embedding algorithm for continuous-tone images is built based on the generalized LSB modification method.

This spatial domain algorithm modifies the lowest levels of the raw pixel values as signal features. As in all Type-II algorithms, recovery of the original image is enabled by compressing, transmitting, and recovering these features. However, unlike in existing Type-II algorithms, a novel compression step utilizes the rest of the host signal as side-information. This property of the proposed method provides excellent compression of the image features. Earlier algorithms in the literature tend to select more complex features to improve the compression performance—thus the lossless embedding capacity.

The embedding capacity-distortion performance of the algorithm can be further improved by modifying only a selected subset of signal samples. Finally, a simple capacity-distortion control mechanism, which minimizes the embedding distortion for a given target capacity, is developed.

A novel lossless (reversible) data embedding (hiding) technique is presented. The technique provides high embedding capacities, allows complete recovery of the original host signal, and introduces only a small distortion between the host and image bearing the embedded data. The capacity of the scheme depends on the statistics of the host image. For typical images, the scheme offers adequate capacity to address most applications. In applications requiring high capacities, the scheme can be modified to adjust the embedding parameters to meet the capacity requirements, thus trading off intermediate distortion for increased capacity. In such scenarios, the Generalized-LSB embedding proposed in the current paper is significantly advantaged over conventional LSB embedding techniques because it offers finer grain scalability along the capacity distortion curve.

A paper, "Lossless Generalized-LSB Data Embedding", by Mehmet Utku Celik, Gaurav Sharma, Ahmet Murat Tekalp and Eli Saber, was presented at the International Conference on Image Processing (ICIP 2002) Sep. 22–25, 2002. Another paper, "Gray level embedded lossless image compression", was published by the inventors in Image Communication 18 (2003) 443–454. The disclosures of both of those publications are hereby incorporated by reference in their entireties into the present disclosure.

BRIEF DESCRIPTION OF THE DRAWINGS

A preferred embodiment of the present invention and variations thereof will be disclosed with references to the drawings, in which:

FIGS. 5A and 5B show flow charts for encoding and decoding, respectively, according to the preferred embodiment;

FIGS. 6A and 6B show a raster scan and identification of pixels, respectively, in a compression scheme used in the preferred embodiment;

FIGS. 8A–8D show the symmetry of possible residual statistics;

FIG. 11 shows capacity as a function of embedding level in the images of FIG. 9.

DETAILED DESCRIPTION OF THE PREFERRED EMBODIMENT

Figure 1A:
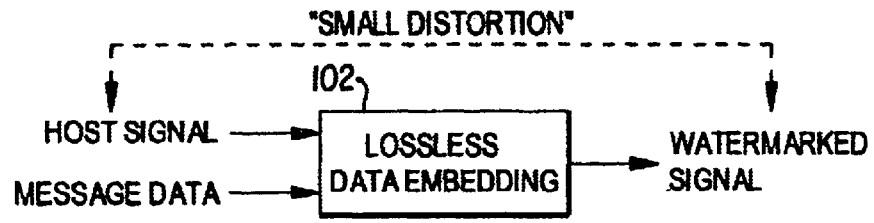
FIGS. 1A and 1B show, respectively, flow charts of encoding and decoding in a generalized lossless data embedding scheme according to the prior art.
Figure 1B:
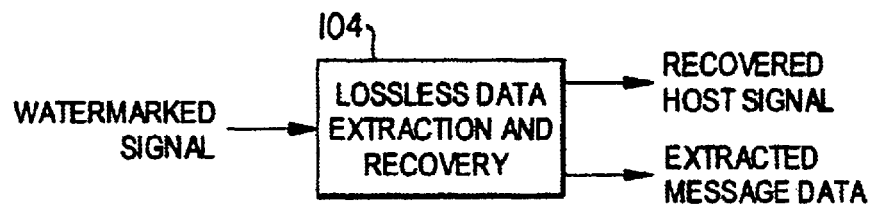
Figure 2:
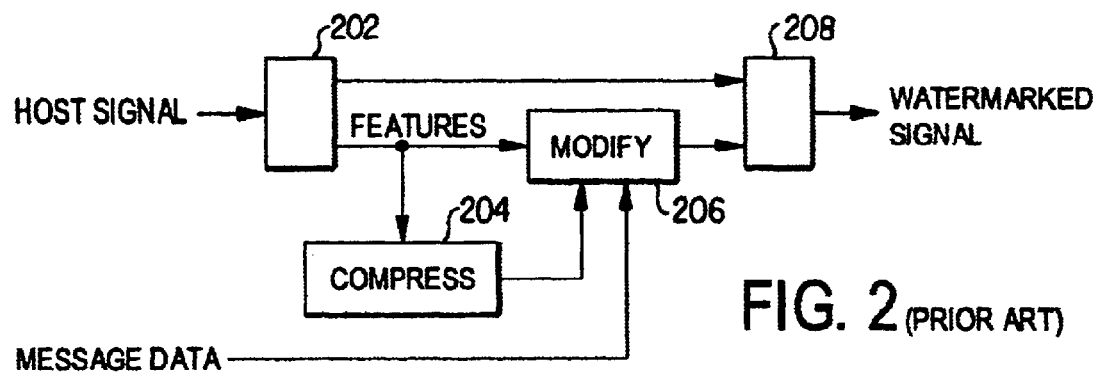
FIG. 2 shows a flow chart of encoding in a Type II lossless data embedding scheme according to the prior art.

A preferred embodiment of the invention and modifications thereof will be described with reference to the drawings.

One of the earliest data embedding methods is the LSB (least significant bit) modification. In this well-known method, the LSB of each signal sample is replaced (over-written) by a payload data bit embedding one bit of data per input sample. If additional capacity is required, two or more LSB's may be over-written allowing for a corresponding bits per sample. During extraction, these bits are read in the same scanning order, and payload data is reconstructed. LSB modification is a simple, non-robust embedding technique with a high embedding capacity and small bounded embedding distortion (J=1). A generalization of the LSB embedding method, namely Generalized-LSB Embedding, is employed here. If the host signal is represented by a vector s, the Generalized-LSB embedding and extraction processes can be represented as $$s_w = Q_L(s) + w, \qquad (1)$$

$$w = s_w - Q_L(s_w) = s_w - Q_L(s), \qquad (2)$$

where $s_w$ represents the signal containing the embedded information, w represents the embedded payload vector of L-ary symbols, i.e. $w_i \in \{0, 1, \ldots, L-1\}$, and $$Q_L(x) = L \left\lfloor \frac{x}{L} \right\rfloor \qquad (3)$$

is an L-level scalar quantization function, and $\lfloor \ \rfloor$ represents the operation of truncation to the integer part.

In the embedding phase, the lowest L-levels of the signal samples are replaced (over-written) by the watermark payload using a quantization step followed by an addition. During extraction, the watermark payload is extracted by obtaining the quantization error—or simply reading lowest L-levels—of the watermarked signal. The classical LSB modification, which embeds a binary symbol (bit) by over-writing the least significant bit of a signal sample, is a special case where L=2. Generalized-LSB embedding enables embedding of a non-integral number of bits in each signal sample and thus, introduces new operating points along the rate (capacity)-distortion curve (see FIG. 4).

The conversion of binary to L-ary strings and back will now be explained. In the preceding paragraph, we assumed that the watermark payload is presented as a string of L-ary symbols $w_i$. In typical practical applications payload data is input and output as binary strings. Therefore, binary to L-ary (and L-ary to binary) pre(post) conversion is required. Moreover, in-practice signal values are generally represented by finite number of bits, which can afford only a limited range of sample values. In certain cases, the embedding procedure outlined above may generate out-of-range sample values. For instance, in an 8 bpp representation (range is [0, 255]) the embedding algorithm with operating parameters L=6, $Q_L(s)$=252 and w=5 will output $s_w$=257, which cannot be represented by an 8 bit value. In general, for a given signal value, watermark symbols can only take M values (w is an M-ary symbol) where N<L.

In order to address these concerns, we employ the following algorithm which converts binary input h into a string of L-ary symbols while preventing overflows. The algorithm is motivated by arithmetic coding for equi-probable input symbols. We start by interpreting the binary input string as the binary representation of a number H in the interval [0,1), i.e. H=.$h_0 h_1 h_2$ ... and H $\in$ [0,1). Furthermore, we let R initially represent this interval [0,1). For our description, we assume the signal is encoded with integer values between zero and $s_{max}$.

The pre-conversion includes the following steps.
1. Given s and $s_{max}$, determine $Q_L(s)$ and the number of possible levels $N=\min(L, s_{max}-Q_L(s))$.
2. Divide R into N equal sub-intervals, $R_0$ to $R_{N-1}$.
3. Select the sub-interval that satisfies $H \in R_n$.
4. Next watermark symbol is $w=n$.
5. Set $R=R_n$ and go to step 1, for the next sample.

Figure 3:
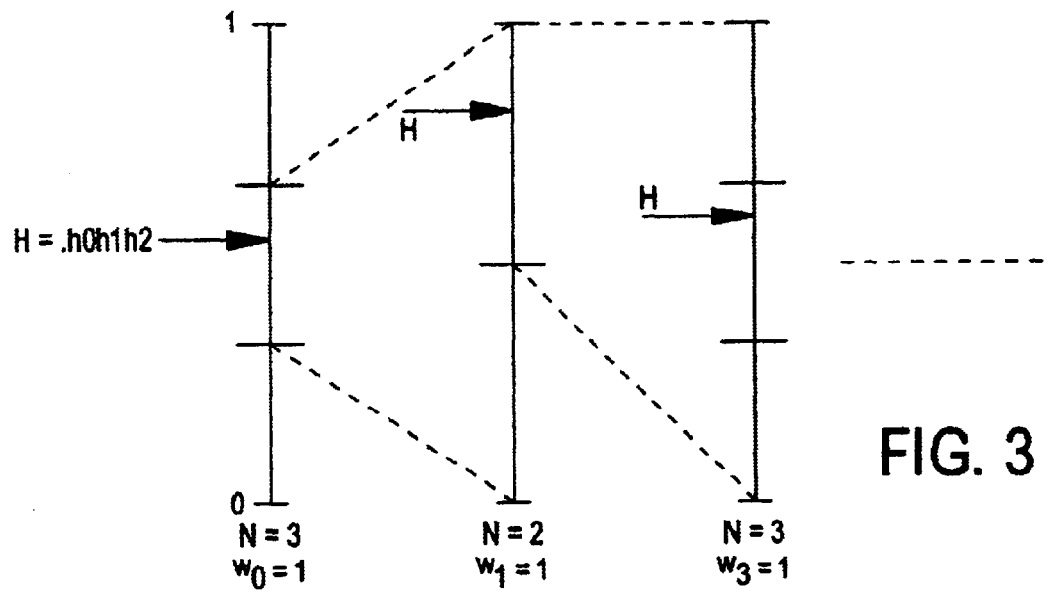
FIG. 3 shows a scheme for conversion of binary data according to the preferred embodiment.

This conversion process is illustrated in FIG. 3. Note that the inverse conversion is performed by the dual of the above algorithm. In particular, watermark symbols, w, are converted into a binary number H by successively partitioning the interval $R=[0,1)$. The number of partitions (active levels), N, on a given signal sample $s_w$ are obtained from $Q_L(s_w)=Q_L(s)$. Pseudo-code for this process is presented below:
1. Given $s_w$ and $s_{max}$, determine $Q_L(s_w)$ and the number of possible levels $N=\min(L, s_{max}-Q_L(s_w))$.
2. Divide R into N equal sub-intervals, $R_0$ to $R_{N-1}$.
3. Set $R=R_w$, where $w=s_w-Q_L(s_w)$ is the current watermark symbol.
4. If there are remaining symbols go to step 1.
5. Find the shortest binary string $H \in R$.

Embedding capacity and distortion will now be considered. In Generalized-LSB embedding (Eqn. 1), each signal sample carries an L-ary watermark symbol $w_i$, which represents $\log_2(L)$ bits of information. Therefore, the embedding capacity of the system is $$C_{GLSB}=\log_2(L) \qquad (4)$$

bits per sample (bps) (barring boundary effects due to overflow restrictions).

A closed form expression for the expected mean square and mean absolute error distortions may be obtained if we assume that: i) data symbols w are equiprobable, which is reasonable if the input data is compressed and/or encrypted, as in many data embedding applications; and ii) the residual signal representing the L lowest levels of the original host signal ($r=s-Q_L(s)$), is uniformly distributed, which is a reasonable approximation for natural imagery, especially for small L.

$$D(MSE) = \frac{1}{L^2}\sum_{r=0}^{L-1}\sum_{w=0}^{L-1}(r-w)^2 = \frac{L^2-1}{6}, \qquad (5)$$

$$D(MAE) = \frac{1}{L^2}\sum_{r=0}^{L-1}\sum_{w=0}^{L-1}|r-w| = \frac{L^2-1}{3L}. \qquad (6)$$

Figure 4:
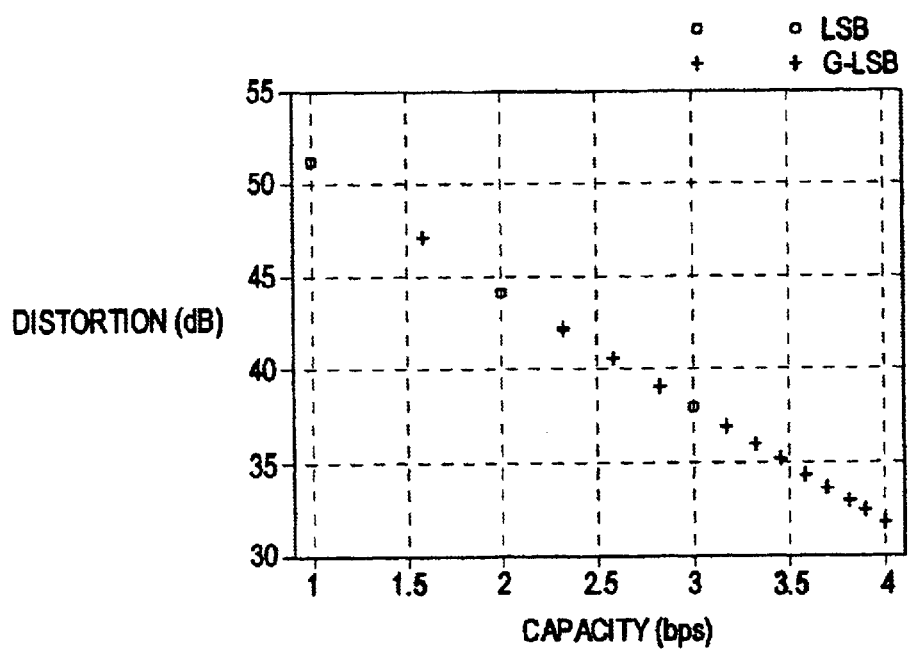
FIG. 4 shows capacity-distortion performance for the scheme of FIG. 3 compared with that for the prior art.

FIG. 4 shows plots of MSE distortion versus the embedding capacity for achievable operating points with LSB and G-LSB embedding schemes. The additional operating points indicate the finer granularity of the proposed Generalized-LSB algorithm.

The G-LSB (Generalized-LSB) embedding algorithm just outlined can be directly used for data embedding with low distortion. However, the method is irreversible, i.e. the host signal is permanently distorted when its lowest levels containing the residual signal are replaced with the watermark signal. This shortcoming can be remedied by including information for reconstruction of the residual signal along with the embedded data in the payload.

FIGS. 5A and 5B show a block diagram of the proposed algorithm. In the embedding phase of FIG. 5A, the host signal s is quantized in step 502, and the residual r is obtained in step 504 (Eqn. 7). The residual is then compressed in step 506 in order to create capacity for the payload data h. The compressed residual and the payload data are concatenated in step 508 and embedded in step 509 into the host signal via G-LSB modification. In particular, the resulting bit-stream is converted to L-ary symbols w and added to the quantized host to form the watermarked signal $s_w$ (Eqn. 1). Note that the compression block uses the rest of the host signal, $Q_L(s)$, as side-information, in order to facilitate better compression and higher capacity.

In the extraction phase of FIG. 5B, the watermarked signal $s_w$ is quantized in step 510, and the watermark payload (the compressed residual and the payload data h) is extracted in step 512 (Eqn. 2). A desirable property of the proposed algorithm is that the payload data extraction is relatively simple, and it is independent of the recovery step. If desired, the algorithm proceeds with the reconstruction of the original host s in step 519. In particular, the residual, r, is extracted from the payload using translation and partitioning in step 514 and is decompressed in step 516 using $Q_L(S_w)=Q_L(s)$ as side-information. The original host, s, is reconstructed by replacing the lowest levels of the watermarked signal with the residual (Eqn. 8).

$$r=s-Q_L(s), \qquad (7)$$

$$s=Q_L(s)+r=Q_L(s_w)+r. \qquad (8)$$

Note that the lossless embedding system has significantly smaller capacity than the raw G-LSB scheme, since the compressed residual typically consumes a large part of the available capacity. The lossless embedding capacity of the system is given by $$C_{Lossless}=C_{GLSB}-C_{Residual}, \qquad (9)$$

where $C_{GLSB}$ is the raw capacity of G-LSB embedding (Eqn. 4) and $C_{Residual}$ is the capacity consumed by the compressed residual. This observation emphasizes the importance of the residual compression algorithm; the better the compression, the higher the lossless embedding capacity.

Efficient compression of the residual is the key to obtaining high lossless embedding capacity. Since the residual signal represents the lowest levels of a continuous-tone image (Eqn. 7), the compression is a challenging task. For small values of L, the residual typically has no structure, and its samples are virtually uniformly distributed and uncorrelated from sample to sample. Direct compression of the residual therefore results in a rather small lossless embedding capacity. However, if the rest of the image information is used as side-information, significant coding gains can be achieved in the compression of the residual, by exploiting the spatial correlation among pixel values and the correlation between high and low levels (bit-planes) of the image.

The proposed method adapts the CALIC lossless image compression algorithm for the lossless embedding scenario. The algorithm is comprised of three main components: i) prediction, ii) context modeling and quantization, iii) conditional entropy coding. The prediction component reduces spatial redundancy in the image. The context modeling stage further exploits spatial correlation and the correlation between different image levels. Finally, conditional entropy coding based on selected contexts translates these correlations into smaller code-lengths. The algorithm is presented below in pseudo-code.
1. $\hat{s}_O$=Predict Current Pixel( ).
2. d, t=Determine Context D,T($\hat{s}_O$).

3. $\dot{s}_O$=Refine Prediction($\hat{s}_O$, d, t).
4. θ=Determine Context Θ($\dot{s}_O$).
5. If (θ≧0),
   Encode/Decode Residual($r_O$, d, θ);
else,
   Encode/Decode Residual(L−1−$r_O$, d, |θ|).

Prediction using surrounding pixels will now be considered. A local neighborhood of a pixel which consists of its 8-connected neighbors is seen in FIG. 6B. In this neighborhood, we denote the current (center) pixel (residual) position by O, and neighboring positions by W, NW, N, NE, E, SE, S, and SW. The residual samples are encoded and decoded in the raster scan order, i.e. left-to-right and top-to-bottom (FIG. 6A). This order guarantees that residuals at positions W, NW, N, NE have already been reconstructed when the center residual, $r_O$, is being decoded. In addition, all quantized pixel values of the image, $Q_L(s)$, are known as side-information. Therefore, at a given position, pixel values s=$Q_L(s)$+r at positions W, NW, N, NE and quantized pixel values $Q_L(s)$ at positions E, SE, S, SW are known. To simplify the notation, we define a reconstruction function $f(.)$, which gives the best known value of a neighboring pixel, exact value if known, or the quantized value plus L/2 (to compensate for the bias in the truncation $Q_L(.)$).

$$f(s_k) = \begin{cases} s_k & \text{if } k \in \{W, NW, N, NE\} \\ Q_L(s_k) + \dfrac{L}{2} & \text{otherwise.} \end{cases} \quad (10)$$

A simple, linear prediction for the current pixel value is calculated using the nearest, 4-connected neighbors of a pixel.

$$\hat{s}_O = \frac{1}{4} \sum_{k \in \{W,N,E,S\}} f(s_k). \quad (11)$$

Since this predictor is often biased, resulting in a non-zero mean for the prediction error, $s_O - \hat{s}_O$, we refine this prediction and remove its bias using a feed-back loop, on a per-context basis. The refined prediction is calculated as $$\dot{s}_O = \text{round}(\hat{s}_O + \bar{\epsilon}(d,t)), \quad (12)$$

where round( ) is the integer round, and $\bar{\epsilon}(d, t)$ is the average of the prediction error ($\epsilon = s_O - \dot{s}_O$) over all previous pixels in the given context (d, t). In order to avoid the propagation of rounding errors, the average prediction error is computed from the refined prediction instead of the raw prediction in Eqn. 11. The resulting predictor $\dot{s}_O$ is a context-based, adaptive, nonlinear predictor.

Typical natural images exhibit non-stationary characteristics with varying statistics in different regions. This causes significant degradation in performance of compression algorithms that model the image pixels with a single statistical model such as a universal probability distribution. If the pixels can be partitioned into a set of contexts, such that within each context the statistics are fairly regular, the statistics of the individual contexts (e.g. probability distributions) may be exploited in encoding the corresponding pixels (residuals) using conditional entropy coding. If the contexts and the corresponding statistical models are chosen appropriately, this process can yield significant improvements in coding efficiency. The context selection problem addresses the fundamental trade-off concerning the number of contexts. Increasing number of contexts better adapt to the local image statistics hence improve the coding efficiency. Since the corresponding conditional statistics often have to be learned on-the-fly observing the previously encoded (decoded) symbols, convergence of these statistics is delayed when a large number contexts are used. The reduction in compression efficiency due to large number of contexts is known as the context dilution problem. A good context model should avoid context-dilution by choosing the optimum number of contexts.

As a first step, we adopt a variant of the d and t contexts, which are defined as follows:

$$\Delta = \sum_{k \in \{W,NW,N,NE,E,SE,S,SW\}} \frac{1}{8} |f(s_k) - \hat{s}_O|, \quad (13)$$

$$d = Q(\Delta), \quad (14)$$

$$t_k = \begin{cases} 1 & \text{if } f(s_k) > \hat{s}_O, \\ 0 & \text{otherwise,} \end{cases} \quad (15)$$

$$t = t_W \| t_N \| t_E \| t_S, \quad (16)$$

where t is obtained by concatenating the individual $t_k$ bits (16 values), and $Q(\Delta)$ is a scalar non-uniform quantizer with 8 levels, whose thresholds are experimentally determined so as to include an approximately equal number of pixels in each bin. The context d corresponds to local activity as measured by the mean absolute error of the unrefined predictor (Eqn. 11) and t corresponds to a texture context that is based on the relations of the individual neighbors to the unrefined predictions.

As described earlier, for each pixel, the (d, t) context is determined and the prediction is refined by using the average prediction error for the previous pixels in the context as in Eqn. 12. In the encoding step, the average prediction error for the context is then updated using the prediction error for the current pixel, in the decoding step, the pixel is first decoded and the update follows.

Figures 7A, 7B, 7C:
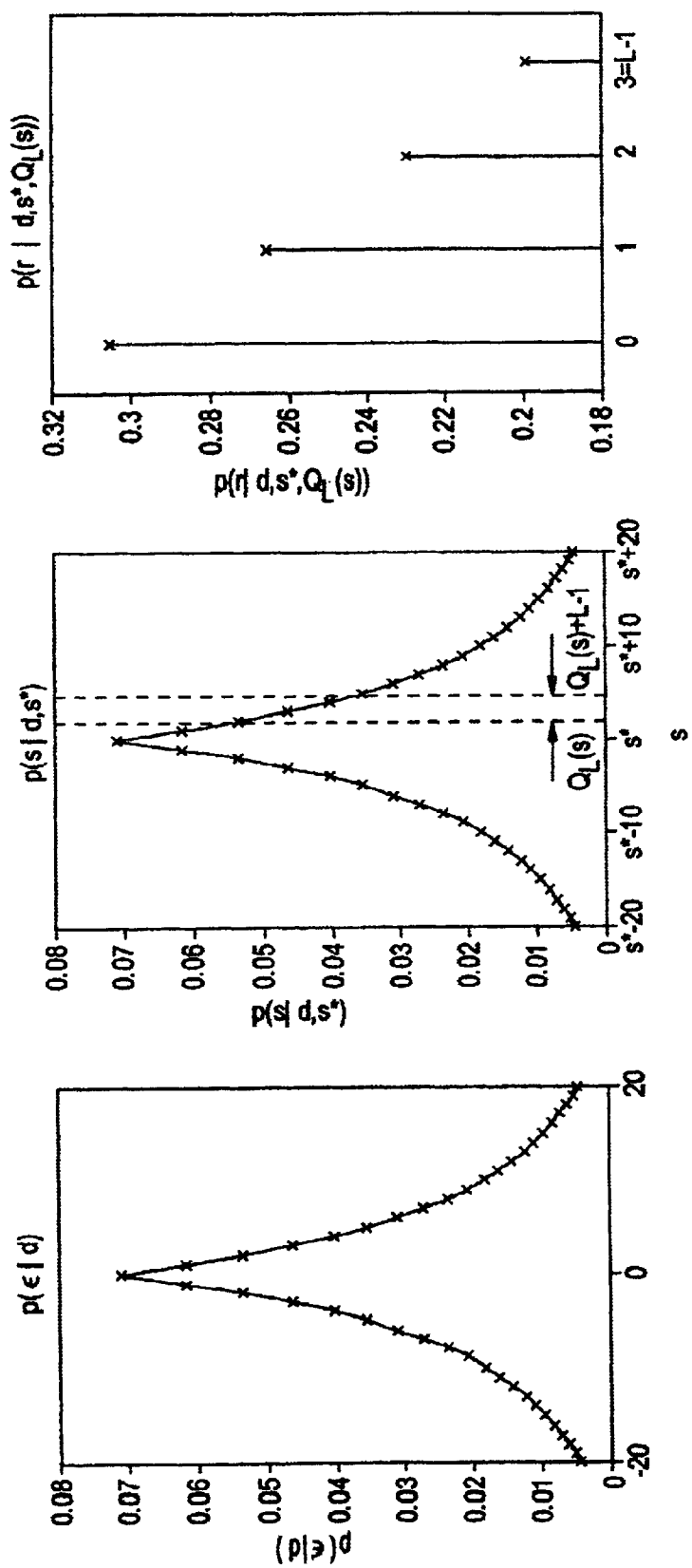
FIGS. 7A–7C show probability mass functions.

Typically, the probability distribution of the prediction error, $\epsilon = s - \dot{s}$, can be approximated fairly well by a Laplacian distribution with zero mean and a small variance which is correlated with the context d. In order to make precise statements, for the following discussion, we assume that the prediction error distribution $p(\epsilon|d)$ is exactly Laplacian with variance $\sigma_d$ determined by d. The arguments and the ensuing conclusions and techniques, however, are largely applicable even when the true distributions deviate from this assumption. FIG. 7A shows a plot of the probability mass function $p(\epsilon|d)$ under this assumption. Given $\dot{s}$, the conditional probability distribution of pixel values $p(s=\dot{s}+\epsilon|d,\dot{s})$ is obtained by shifting the prediction error distribution $p(\epsilon|d)$ by $\dot{s}$. The corresponding probability mass function is illustrated in FIG. 7B.

In typical lossless image compression applications, pixel values are coded using these conditional probability distributions. However, the residual compression problem set forth herein deviates from the usual lossless image compression problem in two aspects: i) The range of residuals, i.e. [0, L), is typically much smaller than the range of pixel values, e.g. [0,255]. Therefore, instead of coding the complete range of pixel values, it is more efficient to encode only the residual. The residual's probability distribution for entropy encoding can be obtained from the pixel statistics;

and ii) The quantized value of the pixel $Q_L(s)$ is known, and this knowledge can be exploited. We address these issues by introducing an additional context, θ, which is used only in the coding process and not in prediction.

In order to motivate the context θ, note that the known quantized value $Q_L(s)$ may be used as an additional context directly. A known quantized pixel value, $Q_L(s)$, limits the possible values of the pixel s to the range [$Q_L(s)$, $Q_L(s)$+L). This is illustrated in FIG. 7B as the region between the two vertical broken lines. The conditional probability mass function $p(r|d,\dot{s},Q_L(s))$ can therefore be obtained by normalizing this segment of the probability mass function to sum up to 1. FIG. 7C illustrates the conditional probability mass function $p(r|d,\dot{s},Q_L(s))$ obtained for the segment illustrated in FIG. 7B. Entropy coding the residual using this conditional pmf restricts the symbol set required thereby improving compression. Note, however, that there are typically a large number of possible values for $Q_L(s)$, which would cause significant context dilution since a large number of samples would be required to learn the statistics for each of these contexts on the fly. The characteristics of the Laplacian distribution, however, allow for a significant reduction in the number of these contexts.

Since the Laplacian distribution decreases exponentially about its peak at $\dot{s}$, the conditional pmf $p(r|d,\dot{s},Q_L(s))$ can be determined from the relative positions of $\dot{s}$ and $Q_L(s)$. For instance, if $\dot{s} \leq Q_L(s)$, the peak is at r=0 and the pmf decreases exponentially and is identical for all cases corresponding to $\dot{s} \leq Q_L(s)$. This case corresponds to the one illustrated in FIGS. 7B and 7C. This allows all the cases corresponding to $\dot{s} \leq Q_L(s)$ to be combined into a single composite context. Similarly, if $\dot{s} \geq Q_L(s)$+L−1, the peak is at r=L−1, and the distribution increases exponentially, which may all be combined into a single context as well. In other cases, when $Q_L(s) < \dot{s} < Q_L(s)$+L−1, the peak is at r=$\dot{s}$−$Q_L(\dot{s})$. Although the total number of contexts after the above reductions is not large, it can be reduced further, if the symmetry of the Laplacian is exploited.

The symmetry of possible residual statistics is illustrated in FIGS. 8A-8D. In particular, the distributions with peaks at $r_\theta$ and L−1−$r_\theta$ are mirror images of each other. If the residual values are re-mapped (flipped $r_{new}$=L−1−$r_{old}$) in one of these two contexts, the resulting distributions will be identical. As a result, we can merge these contexts without incurring any penalty. Furthermore, we encode the re-mapping instruction into the sign of the θ context. We assign each pair of symmetric distributions to an opposite sign, equal magnitude context value (±$\theta_i$). During entropy encoding, first the residuals are re-mapped if necessary. Afterwards, the absolute value of θ is used as the coding context, together with d.

The θ contexts differentiate between statistically different (after incorporating all symmetries) residuals using the knowledge of $\dot{s}$ and $Q_L(s)$. This enables the conditional entropy coder to adapt to the corresponding probability distributions in order to achieve higher compression efficiency. Minimizing the number of such contexts allows the estimated conditional probabilities to converge to the underlying statistics faster. Therefore, it prevents context dilution and improves the compression efficiency.

In our experiments, we have observed that separating the case $\dot{s}=Q_L(s)$ from $\dot{s}<Q_L(s)$ and $\dot{s}>Q_L(s)$+L−1 produces even better compression results. We believe that the rounding in Eqn. 12 partially randomizes the distributions when $Q_L(s) \approx \dot{s}$ and causes this phenomenon. When the corresponding new contexts are created, the total contrast of θ contexts equals $$\left\lfloor \frac{L+1}{2} + 1 \right\rfloor.$$

The total number of coding contexts (d,θ) is 8

$$8 \left\lfloor \frac{L+1}{2} + 1 \right\rfloor.$$

Conditional entropy coding will now be disclosed. At the final step, residual values are entropy coded using estimated probabilities conditioned on different contexts. In order to improve efficiency, we use a context-dependent adaptive arithmetic coder. In a context-dependent adaptive entropy coder, the conditional probability distribution of residuals in each coding context (d, θ) is estimated from the previously encoded (decoded) residual values. That is, the observed frequency of each residual value in a given context approximates its relative probability of occurrence. These frequency counts are passed to an arithmetic coder which allocates best code-lengths corresponding to given symbol probabilities.

A further improvement involves selective embedding and compression. In order to maximize lossless data embedding capacity for a given embedding level, the algorithm presented above utilizes every pixel in a given image, i.e. the residual for each pixel is replaced and incorporated in the embedded data in compressed form and the lowest L signal levels of the pixel are used for embedding data. When a pixel is used for data embedding, it increases the expected embedding distortion by a fixed amount (Eqn. 5). The additional lossless embedding capacity created by the pixel depends on the compressibility of the residual for the pixel, which in turn is may be approximated by the average codeword length for the corresponding context. The average codeword length varies significantly between different coding contexts. In our experiments, we have observed that residual compression is more effective in the "smooth" regions of an image, due to more accurate prediction of pixel values. This observation is supported by the steeper conditional residual probability mass functions (small variance) in contexts corresponding to small values of d, which roughly corresponds to the smooth regions of the image. As a result, using pixels in these contexts (regions) yields a higher embedding capacity for a fixed embedding distortion. Conversely, pixels corresponding to contexts with large values of d contribute small or negative amounts of capacity while still contributing similar amounts of distortion. If these pixels were left unaltered and not included in the embedding process, one would obtain significant reduction in distortion without an appreciable capacity penalty.

Given a target embedding distortion at an embedding level—thus the number of pixels to modify, as each pixel modification adds a fixed distortion in a given level—an ideal algorithm determines the subset of pixels whose residuals can be compressed most effectively. This subset of selected pixels is represented by a mask, m. In the embedding and extraction phases, only the residuals in the mask, m, are compressed, modified, extracted and restored. An algorithm which utilizes a subset of all pixels is called a selective embedding algorithm. The ideal mask, which creates the largest lossless embedding capacity, can be determined by exhaustively compressing residuals in all possible masks with a given number of pixels and choosing the one which results in the shortest compressed description. Alternatively, a sub-optimal mask can be created by estimating the conditional probabilities of all pixels with accumulated residual sample counts for each coding context, and including specified number of pixels starting from the residuals with the shortest codewords. In either case, the resulting mask should either be transmitted to the extraction phase through an additional channel or be re-calculated from the watermarked image, as the error-free extraction of the embedded payload—including the compressed description—is possible only when the same mask is used in the extraction phase. Utilization of an additional channel for mask transmission defeats the very purpose of the data embedding algorithm, which is to avoid such an additional channel. On the other hand, any mask calculation through the use of residual information—as in both of the above cases—cannot be repeated during extraction, because the residual reconstruction follows the payload extraction step.

The algorithm we adopt here calculates an approximation of the ideal mask at a given embedding distortion and level from either the original or watermarked host signal. The proposed algorithm utilizes the structured distortion property of the G-LSB embedding algorithm. It uses the quantized images $Q_L(s)=Q_L(s_w)$ as a common basis for mask calculation, and thus avoids any reference to the residual. The ranking of conditional codeword lengths of each residual is estimated using the smoothness of the quantized signal at that position. In particular, for each pixel, s, the local variance in its 4-connected quantized neighborhood is calculated:

$$\sigma^2 = \frac{1}{4} \sum_{k \in \{W, NW, N, NE\}} (Q_L(s_k) - \mu)^2, \quad (17)$$

where $$\mu = \frac{1}{4} \sum_{k \in \{W, NW, N, NE\}} Q_L(s_k)$$

is the mean of the same four pixels. In our experiments, this smoothness measure is observed to be well correlated with the average codeword length: Codewords are shorter in the average when the variance is low. Afterwards, starting from the pixel with the lowest local variance, specified number of pixels are assigned to the mask. This assignment process can be simplified by collecting a histogram of variance values and determining a threshold where given number of pixels have a lower variance. Then, each pixel is assigned to the mask if its variance is less than the threshold. In practice, a discrete histogram of variance values is collected. Discrete valued histogram bins may lead to a threshold value which assigns more pixels to the mask than the number specified by the distortion. In this case, the assignment procedure is carried out in two passes. In the first pass, all pixels below the threshold except the ones which belong to the histogram bin immediately before the threshold are assigned to the mask. In the second pass, excluded pixels are traversed in a particular scan order and assigned to the mask until total number of pixels in the mask matches the specified number. Since this process uses the quantized images which are not modified by the data embedding, i.e., $Q_L(s)=Q_L(s_w)$, for a given embedding distortion the results of the mask selection are identical for the embedding and extraction processes ensuring that synchronism is maintained.

This extension improves the capacity-distortion performance of the original algorithm, at the expense of increased computational burden of calculating the mask.

Capacity control will now be discussed. Thus far, we have concentrated on maximizing the lossless embedding capacity given an embedding level and a target distortion. In most practical applications, however, the complementary problem is of interest, where the goal is to determine the embedding level and mask which result in the least possible distortion, while providing the given target capacity. The embedding distortion of a given level-mask pair can be fairly accurately estimated using the number of pixels in the mask and the per-pixel distortion as calculated in Eqn. 5. The lossless embedding capacity, on the other hand, is the difference between the embedding capacity of the raw G-LSB scheme and the capacity consumed by the compressed residual. The raw G-LSB embedding capacity is accurately estimated using the number of pixels in the mask and per-pixel capacity for the embedding level (Eqn. 4). On the other hand, capacity consumed by the compressed residuals-sum of codeword lengths-is related to the conditional statistics of these residuals. Although it is possible to approximate the relative ordering of average codeword length of residuals, their exact value cannot be predicted without using actual residuals, which are not available during extraction of the payload at the extraction and recovery phase. As a result, the problem of selecting a minimum-distortion embedding level and mask which satisfy the target capacity is intractable, unless these parameters are transmitted through an additional channel. An additional low through-put channel can be constructed by modifying LSB's of a small number of pixels at fixed positions, say the first n pixels, which will be excluded in the actual mask. In order to ensure recovery, the original LSB's of these pixels are transmitted as a part of the payload. Typically the through-put of such a channel does not support an arbitrary mask and an efficient mechanism for representing and communicating the mask is necessary.

A more suitable approach that is utilized here, is to vary the embedding level L and the target distortion in so as to achieve the desired capacity. In order to allow extraction and recovery, the embedding level L and the final target distortion must be communicated to the receiver and this can be achieved using the additional channel described above. In order to limit the required through-put from this additional channel, only a limited set of level-distortion pairs are used. After obtaining the level and distortion parameters through the additional fixed channel, the extraction algorithm calculates the embedding mask which maximizes the embedding capacity. As a result, the capacity-control problem, i.e. minimizing the distortion given a target capacity at the embedding phase, is reduced to finding the embedding level-distortion pair (from a limited set of such pairs) which has the minimum distortion and satisfies the capacity requirement. The achievable capacity of a given level-distortion pair is obtained by compressing the residual and calculating the G-LSB embedding capacity with the given parameters. An iterative algorithm, which searches through level-distortion pairs in the given limited set, finds the best operating point among all possible points. In a simple instance of such an iterative technique, the level-distortion pairs (possible operating points) are ordered starting from the lowest distortion. The algorithm sequentially computes the capacities for each element in this list, until the target capacity is met.

Figure 9:
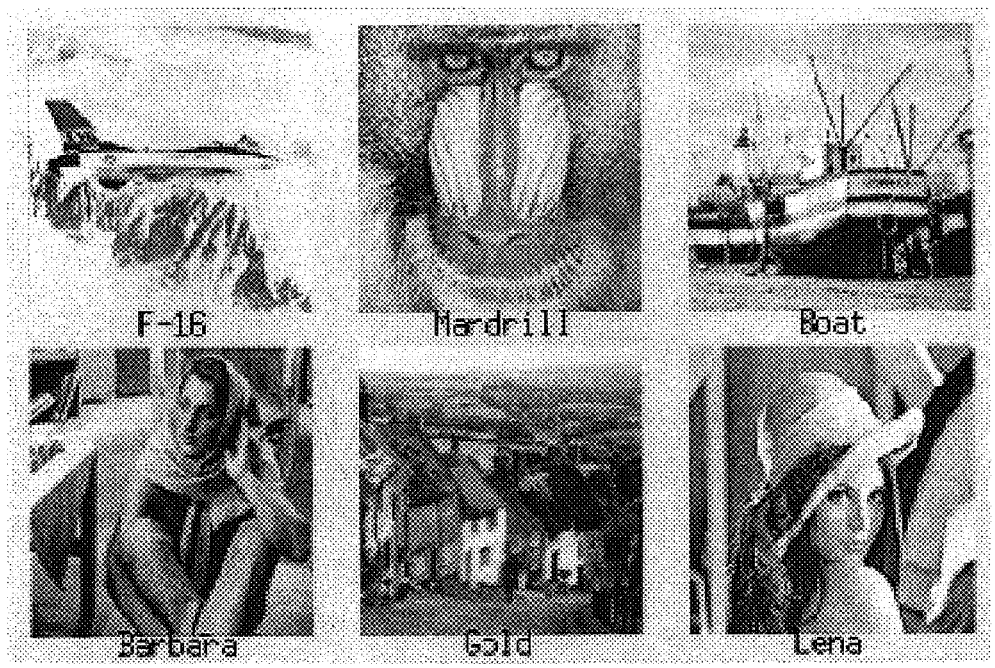
FIG. 9 shows six images used in experimental verification of the preferred embodiment.

The lossless G-LSB embedding algorithm and its selective embedding extension have been implemented and tested on a number of images. The images used in the evaluation are shown in FIG. 9. The images range from fairly smooth images, e.g. F-16, to highly textured images, e.g. Mandrill. We first present an overview of the implementation issues. Thereafter, the performance of the core algorithm and its extension are presented and compared to the existing schemes.

The adaptive binary to L-ary conversion algorithm is a variant of the arithmetic (de)coding process with equal symbol probabilities. Therefore, an integer implementation of arithmetic coding is employed. Over the images listed, this implementation achieves a practical capacity within 4 bits of the theoretically estimated embedding capacity in Eqn. 4. The same algorithm is also used as the adaptive arithmetic coder for residual compression.

In capacity-controlled selective embedding, level-distortion pairs are coded by the level and pixel-percentage pairs. In order to accelerate the optimization search and reduce the signaling overhead, the possible embedding levels are limited to L=[2,16] and percentage of modified pixels is quantized to one of {25%, 50%, 75%, 100%}. These level-percentage pairs are further coded and represented by a single overhead byte. The values mentioned here are selected for illustrative purposes and can be customized based on the individual requirements of specific applications.

In order to guarantee flawless operation, we define a simple protocol and an associated syntax for the embedded payload. First, the overhead byte representing the embedding parameters is embedded in the LSB's of first 8 pixels of the raster scan order. The original values of these pixel LSBs are buffered and these positions are excluded in any subsequent embedding mask. Payload to be embedded using the G-LSB algorithm consists of four parts: i) length of message data in bytes, ii) message data, iii) buffered LSB's, iv) compressed residual description. The length of the message data is represented by two bytes allowing for a maximum length of 64K bytes (a variable size length descriptor can be utilized if message data is expected to be larger). The length of the compressed description is not specified since the total number of coded symbols (residuals) is defined by the pixel-percentage parameter. The payload data constructed according to this syntax is embedded into the image using G-LSB embedding algorithm. A total of three bytes, two byte length plus the overhead byte, is the overall overhead. In applications where a fixed length message is embedded, the overhead can be reduced accordingly.

The lossless-embedding capacity-distortion performance of the proposed algorithm has been evaluated for the 512×512 gray-scale images seen in FIG. 9. The lossless capacity obtained by embedding at various levels for each of these six images is plotted against the embedding level L in FIG. 11. A subset of these results is tabulated in Table I, where the average embedding distortion induced when the full capacity is utilized is also included. These average distortion values obtained from the watermarked images agree quite well with the theoretical results from Eqn. 5. From FIG. 11 and Table I, we can see that the capacity of the proposed method is heavily dependent on the characteristics of the host image. Images with large smooth regions, e.g. F-16, accommodate higher capacities than images with irregular textures, e.g. Mandrill. In smooth regions, the predictor is more accurate, and therefore conditional residual distributions are steeper with smaller variances. These distributions result in shorter code-lengths, and thus higher embedding capacities.

For each individual image, the capacity of the scheme increases roughly linearly with number of levels (or exponentially with number of bit-planes). This is due to stronger correlation among more significant levels (bit-planes) of the image and the algorithm's ability to exploit this correlation. The rate of the increase, however, is not entirely constant either among images or throughout the levels.

Figure 10:
FIG. 10 shows original and watermarked versions of another image.

The visual impact of the data embedding can be seen in FIG. 10, where the original "Gold" image is compared to the watermarked version in which a random message of over 3400 Bytes (27200 bits) is embedded using an embedding level of L=6. The visual distortion introduced by the embedding is quite small, though, upon close inspection, a small amplitude white noise may be observed in the watermarked version. Common applications of lossless embedding such as meta-data tagging and authentication have fairly small to modest capacity requirements, which can be met with relatively small visual distortion in the watermarked image.

The images in the test set above were all of a fixed size of 512×512 pixels. In order to test the effects of image size on the embedding capacity, the Gold image was divided into four quadrants and the sub-images corresponding to each quadrant was independently used for lossless embedding at a level L=2. The capacity degrades by 13% as result of sub-dividing the image. Starting from top-left and in clockwise direction embedding capacities are 83, 94, 61, and 30 bytes with a total of 268 bytes instead of 309 bytes. This reduction is induced by the modeling cost associated with multiple contexts, i.e. time for adapting to the image statistics for each context, and the increased total signaling overhead.

The three images, Mandrill, Barbara, F-16, corresponding respectively to low, medium and high embedding capacities were selected as representatives for the evaluation of the selective embedding extension to the lossless embedding algorithm. The lossless embedding capacities and distortion obtained for embedding levels L=2, 4, 8 by utilizing one to four fourths, i.e. 25, 50, 75, 100%, of all pixels in data embedding for each of these cases is listed in in Table. II. The specific pixels corresponding to these individual percentages are appropriately chosen so as to minimize distortion. Note that these percentage points are chosen for illustrative purposes. A different or a larger set of percentage values may be used, if desired. Likewise, other embedding levels can also be utilized. In Table II, we observe that the minimum achievable distortion is reduced (down to 57.1 dB at L=2 with 25% pixels selected for embedding) by the extension. This property is useful in applications which require small capacities and ultra-low embedding distortions. The selective embedding extension also offers additional operating points with different distortion values which further improves the capacity distortion scalability provided by the different embedding levels of the G-LSB algorithm. Since the selective embedding process chooses pixels that are likely to provide the largest embedding capacity and therefore its capacity does not drop in proportion to the percentage of pixels used in embedding but at a much smaller rate. This is apparent in Table II where we see that the embedding distortion may be reduced by at least 1 dB with a negligible (less than 2%) reduction in the embedding capacity. The selective modification extension therefore leads leads to improved capacity-distortion performance. For instance, the embedding capacity for Mandrill at approximately 47 dB is 241 Bytes in the original method (Table. I). On the other hand, the extension yields a capacity of 424 Bytes—a 76% increase—at a slightly lower distortion (47.2 dB vs. 46.9 dB in the original algorithm) when 50% of all pixels are used. Similar trends are seen at various points for other images as well.

TABLE I

Available capacity (bytes) for each image versus levels and average PSNR (dB) when full capacity is used

| Level | 2 | 3 | 4 | 5 | 6 | 8 | 10 | 12 | 14 | 16 |
|---|---|---|---|---|---|---|---|---|---|---|
| PSNR (dB) | 51.1 | 46.9 | 44.2 | 42.1 | 40.5 | 38.0 | 36.0 | 34.4 | 33.0 | 31.9 |
| F-16 | 2190 | 4757 | 7640 | 10155 | 13452 | 17863 | 22673 | 26962 | 30828 | 34239 |
| Mandrill | 80 | 241 | 458 | 746 | 1112 | 1910 | 2815 | 3849 | 4640 | 5793 |
| Boat | 629 | 1707 | 3074 | 4620 | 6219 | 9835 | 13190 | 16313 | 18674 | 22282 |
| Barbara | 558 | 1503 | 2692 | 4094 | 5551 | 8298 | 11198 | 13622 | 16172 | 17604 |
| Gold | 309 | 879 | 1576 | 2451 | 3441 | 5656 | 8007 | 10445 | 12376 | 14569 |
| Lena | 598 | 1537 | 2856 | 4297 | 5893 | 9347 | 12712 | 15768 | 19117 | 22127 |

TABLE II

Selective Embedding Extension: Available capacity (bytes) and average PSNR (dB) when full capacity is used

| Level | % Pixels used | PSNR (dB) | F-16 | Mandrill | Barbara |
|---|---|---|---|---|---|
| 2 | 25 | 57.1 | 1393 | 50 | 302 |
| 2 | 50 | 54.1 | 1906 | 73 | 505 |
| 2 | 75 | 52.4 | 2159 | 76 | 553 |
| 2 | 100 | 51.1 | 2190 | 80 | 558 |
| 4 | 25 | 50.2 | 2666 | 301 | 1410 |
| 4 | 50 | 47.2 | 5731 | 424 | 2413 |
| 4 | 75 | 45.5 | 7452 | 445 | 2668 |
| 4 | 100 | 44.2 | 7640 | 458 | 2692 |
| 8 | 25 | 44.0 | 4643 | 1181 | 2965 |
| 8 | 50 | 41.0 | 10964 | 1721 | 7233 |
| 8 | 75 | 39.4 | 17010 | 1850 | 8199 |
| 8 | 100 | 38.0 | 17863 | 1910 | 8298 |

TABLE III

Available capacity (bytes) and average PSNR (dB) when one LSB-plane is compressed with LZW or JBIG algorithms. Zero capacity indicates no or negative capacity.

| Bit-plane | 1 | 2 | 3 | 4 |
|---|---|---|---|---|
| PSNR (dB) | 51.1 | 45.1 | 39.1 | 33.1 |
| F-16 (LZW) | 0 | 7 | 1033 | 4756 |
| F-16 (JBIG) | 0 | 0 | 1264 | 7928 |
| Mandrill (LZW) | 0 | 0 | 0 | 0 |
| Mandrill (JBIG) | 0 | 0 | 0 | 0 |
| Barbara (LZW) | 0 | 0 | 0 | 1068 |
| Barbara (JBIG) | 0 | 0 | 0 | 1174 |

The performance of the proposed method was also compared against other Type-II lossless data embedding algorithms. We restrict our attention to Type-II algorithms, since Type-I algorithms typically have inferior distortion-capacity performance. Early work on Type-II lossless embedding proposed compressing one of the LSB planes of the image by either using a bi-level lossless image compression algorithm, e.g. JBIG, or by using a dictionary based general purpose compression scheme, e.g. LZW (gzip). We replicated these methods by extracting the different LSB-planes of the images and compressing them by JBIG and gzip compression utilities. The capacity estimates obtained through this process are tabulated in Table III. Note that the bit-planes are numbered starting from the least significant, #1, proceeding with more significant ones. (LSB #4 corresponds to the fifth most significant bit-plane.) From the table, it is apparent that direct compression approaches which attempt to compress the residual signal-or LSB planes-alone without utilizing the rest of the image perform significantly worse than the proposed scheme. In many cases, the compression algorithms actually expand the data. The conditional entropy coding scheme adopted here, however, successfully exploits the intra pixel correlation among the different levels of the same pixel and the inter-pixel correlations among neighbors, thus provides improved embedding capacities even at low distortions.

An elegant Type II lossless data embedding method called RS-Embedding has recently been reported, which offers significantly better results. In this method, first a flipping function, $F_A(.)$, is defined. The flipping function $F_A(.)$ is a permutation on the set of possible pixel values, which swaps pairs of pixel values, separated by a defined amplitude A. $F_1(.)$ with amplitude of one corresponds to LSB flipping. Small groups of pixels from the image, G's, are classified into regular (R), singular (S), or unusable (U) classes based on the flipping function and a suitably chosen discriminant function, f ( ). In particular, a group G is regular if $f(F_A(G)) > f(G)$, singular if $f(F_A(G)) < f(G)$ and unusable otherwise, where the flipping function is applied to one or more the pixels constituting the group. The discriminant function is intended to measure the smoothness of the group of pixels and for suitably chosen pixel groups and discriminant function, a majority of pixel groups appear regular in typical natural images.

From the definition of the R, S and U groups it is apparent that the flipping function transforms an R group of pixels in to an S group, and S group into an R group, and a U group into a (different) U group. In addition, application of the flipping function twice to any group restores it to its original pixel values. These properties are the basis for information embedding and recovery in the RS-Embedding method. A binary payload is embedded in an image as a string of R, S features where, for instance R represent the binary value 1 and S represent 0. U groups are skipped in the embedding and extraction process. The image pixel groups are scanned in a pre-defined order. For each, R or S group if the R/S classification matches the payload bit to be embedded, it is left unaltered, if not, the flipping function is applied to the group to ensure that the R/S classification matches the payload bit. To enable recovery of the original host at the receiver, the bitstream of RS features corresponding to the original image is compressed and included in the embedded payload. Thus, in the embedding, first the pixel groups in the original host image are scanned in a pre-defined order and the status of R and S groups is computed as a bit-stream (R=1, S=0), with the U groups simply skipped in the process. The RS bitstream is then compressed to obtain a smaller bit-stream C. In the specific implementation used here, a binary adaptive arithmetic coder is used to compress the original string of R, S features. The message data is concatenated with the compressed bit-stream C to form the payload which is finally embedded in the image as outlined above. Suitable header information is included while concatenation to allow it to be undone.

In the data extraction and recovery process, the R, S bit-stream (R=1, S=0) of the watermarked image is computed by scanning the image groups in the same order as the embedding process (once again ignoring U groups). The bit-stream is partitioned in to the extracted message data and the compressed bit-stream C representing the R, S values for the original host image by reversing the concatenation step. Decompression of C yields the R, S values for original host. Finally, the original host is recovered by again scanning the image pixel groups and restoring the original R/S status of the groups by applying the flipping function to the R/S groups whose classification differs from the original.

As in all Type-II lossless embedding schemes, the capacity available for lossless embedding depends on the compressibility of the string representing the original R, S features. The compression scheme exploits the imbalance between the number of R and S groups. The zeroth order entropy of the R, S bit-stream corresponding to the original host image, therefore, provides an accurate estimate of the fraction of the capacity that is consumed by the compressed recovery information, and equivalently the lossless embedding capacity.

The capacity of the RS-Embedding scheme depends on the specific choices for the pixel scan-order, the pixel groups G, the discriminant function f (.), and the amplitude A of the flipping function. Increasing amplitude A typically causes a monotonic increase in the lossless embedding capacity and in the embedding distortion. For a given flipping amplitude A, the imbalance between the number of R and S groups is strongly dependent on the choice of the discriminant function and pixel groups. For our evaluation, we consider the two-pass "checkerboard" scheme. In this scheme, the image is divided into "Black" and "White" pixels in the same way as a chess board (the pixel at (i, j) is black if i+j is odd, and white otherwise). In the first pass, the black pixels are traversed in raster scan order (left to right and top to bottom) and the white pixels are scanned in the second pass similarly. The pixel group for computing the discriminant function is defined as the nearest 4-connected neighbors of the current pixel being traversed, with the origin O representing the current pixel and the 4 neighbors W, N, E, S as defined in FIG. 6B. The discriminant function for a grouping centered at origin O defined as $$f(s_O, s_W, s_N, s_E, s_W) = \sum_{k \in \{W,N,E,S\}} |s_O - s_k|, \quad (18)$$

and the application of the flipping function to a group consists of flipping the value for the pixel at the origin using the defined amplitude flipping function leaving other pixels unaltered. Note that the pixel groups in this scheme are overlapping, however, the restriction of the flipping function to the pixel at the origin and use of the checkerboard pattern ensures proper embedding and recovery, since each pixel is traversed and potentially flipped only once.

The version of RS-Embedding outlined above was tested on the images, Mandrill, Barbara, and F-16. The amplitude for the flipping function A was varied from 1 to 6 in order to explore the capacity-distortion performance of the scheme. Table IV lists the capacity obtained (in bytes) and average embedding distortions for each of these embedding amplitudes.

TABLE IV

Available capacity (bytes) and average PSNR (dB) corresponding to selected amplitudes for RS-Vector Algorithm

| Amplitude A | 1 | 2 | 3 | 4 | 5 | 6 |
|---|---|---|---|---|---|---|
| PSNR(dB) | 52.9 | 46.4 | 42.5 | 39.8 | 37.8 | 36.1 |
| F-16 | 1529 | 4182 | 6604 | 8402 | 9746 | 10901 |
| Mandrill | 66 | 257 | 573 | 987 | 1439 | 1940 |
| Barbara | 327 | 1228 | 2434 | 3632 | 4818 | 5758 |

Figure 12:
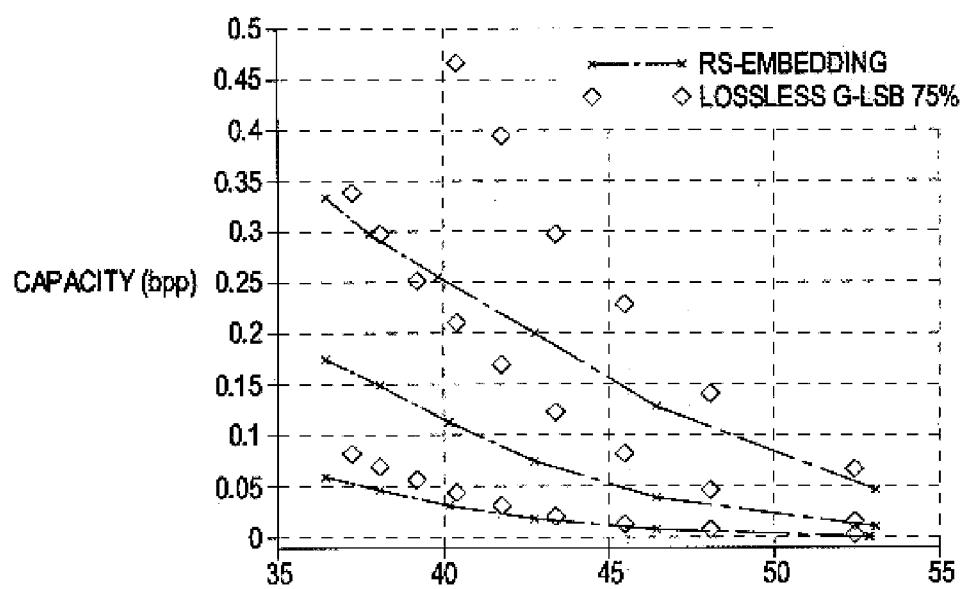
FIG. 12 shows a comparison of capacity for the preferred embodiment and an embedding technique of the prior art for the images of FIG. 9.

These values are compared with the proposed scheme extension at 75% on a capacity-distortion basis in FIG. 12. The lossless G-LSB scheme has three advantages over the RS-Embedding scheme: i) G-LSB and its extension allow greater flexibility and finer capacity-distortion granularity. ii) They achieve a significantly higher embedding capacity for a comparable distortion. This demonstrates the effectiveness of the selected compression technique. The capacity differential increases as the allowable embedding distortion is increased and high levels or amplitudes are used. Besides the compression, this change of rate is related to the different modification methods employed by each algorithm. In RS-Embedding each pixel has modified by a single amplitude, A, and represents a binary symbol (Average distortion $A^2/2$, capacity 1 bpp.). On the other hand, in G-LSB each pixel is modified by a multitude of values, and it represents an L-ary symbol (Average distortion $(L^2-1)/6$, capacity $\log_2(L)$ bpp.) Note that the lossless embedding capacity does not scale accordingly, because L-ary symbols have longer associated codeword lengths during compression. iii) The lossless G-LSB embedding can achieve capacities exceeding 1 bpp, while RS-Embedding's performance is, bounded above by 1 bpp. This may occur when images with large very smooth regions are used, e.g. document images. Nevertheless, the RS-Embedding algorithm has the advantages of simple implementation and low computational complexity.

The invention disclosed above can be used to implement a localized lossless authentication watermark. By validating the authenticity of the image first, we avoid the computationally expensive image reconstruction step when i) the watermarked image is of sufficient quality and the original image reconstruction is not necessary, ii) the image under inspection is not authentic, i.e. it has been tampered after watermarking, or iii) the image has not been watermarked at all. If the original image is reconstructed, its authenticity is inferred from that of the pre-embedded image without any additional computation or sacrifice of security. Earlier methods either require the reconstruction of the original, or require verification of multiple watermarks (digital signatures). In the latter case, the use of a single authentication watermark also saves valuable reversible data embedding capacity. At the embedder, performing the reversible data embedding step before authentication watermarking offers similar computational advantages. For instance, an application may require inserting current time-stamps as a part of the authentication watermark. In this case, pre-embedding is performed only once and different authentication information is inserted at each time a client requests the image. Avoiding multiple pre-embedding processes reduces the load on the server.

Given an image I, the reversible pre-embedding step first reads the original values of LSBs of pixels at selected positions. These LSBs are later set to zero. Modified image is passed to the Lossless G-LSB algorithm, which embeds original LSB values in a reversible manner, thus creates additional capacity. Note that the lossless data embedding avoids modifying pixels at selected locations. These locations are determined a priori and they are shared with the authentication watermark. Let us denote the image after pre-embedding by IPE. In the second phase, IPE is divided into blocks in a multi-level hierarchy and block signatures are computed. The block signatures are inserted into the image by replacing the LSBs of pixels that have been selected and reset earlier. The watermarked image is denoted by IW Note that IW differs from IPE at only those LSB positions.

At the receiver end, first the watermark verification step tries to authenticate the image. The LSBs at predetermined positions are read and set to zero. If the image under inspection is a watermarked image, the LSBs represent the block signatures and the modified image is exactly equal to the pre-embedded image IPE. In this case, the signatures validate the authenticity and integrity of IW and IPE is passed to the image reconstruction phase. If the image under inspection is tampered, the signature verification step fails and a tamper localization map is generated by the hierarchical authentication procedure. If the image is authentic and image reconstruction is desired, lossless data embedding procedure is reversed and original values of the selected LSBs are extracted. After restoring those LSBs, the original image is reconstructed exactly, i.e. without any distortion.

The present invention also provides an improved compression scheme. The image is separated into a base layer and a residual layer, as described above. The residual layer is compressed as described above, and the base layer is also compressed. The base layer can be divided into a further base layer and a further residual layer; that process can be performed iteratively.

While a preferred embodiment of the invention has been disclosed above, those skilled in the art who have reviewed the present disclosure will readily appreciate that other embodiments can be realized within the scope of the invention. For example, the invention is not limited to use with grayscale image files or to use with image files at all; instead, other types of host files can be used. Also, file formats and numerical values are illustrative rather than limiting. Therefore, the present invention should be construed as limited only by the appended claims.

We claim:

1. A method for embedding information in a digital signal, the method comprising the steps of:
   (a) dividing at least a part of the digital signal into a base layer and a residual layer;
   (b) compressing the residual layer in accordance with both the base layer and the residual layer to produce a compressed residual layer;
   (c) combining the compressed residual layer with the information to produce a payload; and
   (d) combining the base layer with the payload.

2. The method of claim 1, wherein the digital signal is an image signal.

3. The method of claim 2, wherein the image signal comprises a plurality of pixels, and wherein the residual layer comprises one or more least significant bits of at least some of the pixels.

4. The method of claim 3, wherein step (b) comprises decreasing an amount of redundancy in the residual layer by:
   (i) performing a prediction for each of the pixels in accordance with neighboring ones of the pixels;
   (ii) determining a context of the prediction of each of the pixels;
   (iii) performing a refined prediction in accordance with the context;
   (iv) determining a context of the refined prediction of each of the pixels; and
   (v) using the context of the refined prediction to determine an encoding of the residual layer for each of the pixels.

5. The method of claim 1, wherein the information comprises information for authenticating the digital signal.

6. The method of claim 1, wherein step (d) comprises encoding the payload into a string of symbols by:
   (i) considering a binary representation of the payload as being a binary representation of a number within a range;
   (ii) dividing the range into a plurality of levels;
   (iii) identifying one of the plurality of levels into which the number falls;
   (iv) determining one of the symbols in accordance with the identified level; and
   (v) taking the identified level to be the range; and
   (vi) reiterating steps (d)(ii) through (d)(v) until the string of symbols is formed.

7. The method of claim 1, wherein step (b) comprises estimating a mask for identifying a portion of the residual layer with maximum compressibility.

8. The method of claim 1, wherein step (a) comprises quantizing the base layer to a variable level of quantization.

9. A method for extracting information which has been embedded in a digital signal, the method comprising the steps of:
   (a) dividing at least a part of the digital signal into a base layer and a residual layer;
   (b) partitioning the residual layer into a compressed original residual layer and the information; and
   (c) decompressing the compressed original residual layer in accordance with both the compressed residual layer and the base layer to provide a decompressed original residual layer.

10. The method of claim 9, further comprising step (d) using the decompressed original residual layer to restore the digital signal to an original form.

11. The method of claim 10, wherein the information comprises information for authenticating the original form of the digital signal, and wherein the method further comprises step (e) authenticating the original form of the digital signal using the information for authenticating.

12. The method of claim 10, wherein the digital signal is an image signal.

13. The method of claim 12, wherein the image signal comprises a plurality of pixels, and wherein the residual layer comprises one or more least significant bits of at least some of the pixels.

14. The method of claim 13, wherein step (c) comprises:
   (i) performing a prediction for each of the pixels in accordance with neighboring ones of the pixels;
   (ii) determining a context of the prediction of each of the pixels;
   (iii) performing a refined prediction in accordance with the context;

(iv) determining a context of the refined prediction of each of the pixels; and (v) using the context of the refined prediction to determine a decoding of the residual layer for each of the pixels.

15. The method of claim 9, wherein step (b) comprises converting the residual layer from a string of symbols by:

(i) considering a binary representation of the residual layer as being a binary representation of a number within a range;

(ii) dividing the range into a plurality of levels;

(iii) identifying, from one of the signals, one of the plurality of levels into which the number falls;

(v) taking the identified level to be the range;

(vi) reiterating steps (b)(ii) and (b)(iii) until an end of the string of symbols is reached to identify a final range; and (vii) identifying the number from a shortest binary representation within the final range.

16. An article of manufacture for storing information embedded in a digital signal, the article of manufacture comprising:

(a) a computer-readable storage medium; and (b) a file written on the computer-readable storage medium, the file comprising:

(i) a base layer of the digital signal; and (ii) a payload comprising both the embedded information and a compressed version of a residual layer from which, in combination with the base layer, the digital signal can be reconstructed by decompressing the residual layer in accordance with both the base layer and the compressed residual layer.

17. The article of manufacture of claim 16, wherein the digital signal is an image signal.

18. The article of manufacture of claim 17, wherein the image signal comprises a plurality of pixels, and wherein the residual layer comprises one or more least significant bits of at least some of the pixels.

19. The article of manufacture of claim 16, wherein the information comprises information for authenticating the digital signal.

20. The article of manufacture of claim 16, wherein the base layer comprises a second base layer and a second payload.

21. A system for embedding information in a digital signal, the system comprising:

an input for receiving the information and the digital signal;

a processor, in communication with the input, for performing the steps of:

(a) dividing at least a part of the digital signal into a base layer and a residual layer;

(b) compressing the residual layer in accordance with both the base layer and the residual layer to produce a compressed residual layer;

(c) combining the compressed residual layer with the information to produce a payload; and (d) combining the base layer with the payload to form an output file; and an output, in communication with the processor, for outputting the output file.

22. The system of claim 21, wherein the digital signal is an image signal.

23. The system of claim 22, wherein the image signal comprises a plurality of pixels, and wherein the residual layer comprises one or more least significant bits of at least some of the pixels.

24. The system of claim 23, wherein the processor performs step (b) by decreasing an amount of redundancy in the residual layer by:

(i) performing a prediction for each of the pixels in accordance with neighboring ones of the pixels;

(ii) determining a context of the prediction of each of the pixels;

(iii) performing a refined prediction in accordance with the context;

(iv) determining a context of the refined prediction of each of the pixels; and (v) using the context of the refined prediction to determine an encoding of the residual layer for each of the pixels.

25. The system of claim 21, wherein the information comprises information for authenticating the digital signal.

26. The system of claim 21, wherein the processor performs step (d) by encoding the payload into a string of symbols by:

(i) considering a binary representation of the payload as being a binary representation of a number within a range;

(ii) dividing the range into a plurality of levels;

(iii) identifying one of the plurality of levels into which the number falls;

(iv) determining one of the symbols in accordance with the identified level; and (v) taking the identified level to be the range; and (vi) reiterating steps (d)(ii) through (d)(v) until the string of symbols is formed.

27. The system of claim 21, wherein the processor performs step (b) by estimating a mask for identifying a portion of the residual layer with maximum compressibility.

28. The system of claim 21, wherein the processor performs step (a) by quantizing the base layer to a variable level of quantization.

29. A system for extracting information which has been embedded in a digital signal, the system comprising:

an input for receiving the digital signal;

a processor, in communication with the input, for performing the steps of:

(a) dividing at least a part of the digital signal into a base layer and a residual layer;

(b) partitioning the residual layer into a compressed original residual layer and the information; and (c) decompressing the compressed original residual layer in accordance with both the base layer and the compressed residual layer to provide a decompressed original residual layer; and an output, in communication with the processor, for outputting the information.

30. The system of claim 29, wherein the processor further performs step (d) using the decompressed original residual layer to restore the digital signal to an original form.

31. The system of claim 30, wherein the information comprises information for authenticating the original form of the digital signal, and wherein the processor further performs step (e) authenticating the original form of the digital signal using the information for authenticating.

32. The system of claim 30, wherein the digital signal is an image signal.

33. The system of claim 32, wherein the image signal comprises a plurality of pixels, and wherein the residual layer comprises one or more least significant bits of at least some of the pixels.

34. The system of claim 33, wherein the processor performs step (c) by:
 (i) performing a prediction for each of the pixels in accordance with neighboring ones of the pixels;
 (ii) determining a context of the prediction of each of the pixels;
 (iii) performing a refined prediction in accordance with the context;
 (iv) determining a context of the refined prediction of each of the pixels; and
 (v) using the context of the refined prediction to determine a decoding of the residual layer for each of the pixels.

35. The system of claim 29, wherein the processor performs step (b) by converting the residual layer from a string of symbols by:
 (i) considering a binary representation of the residual layer as being a binary representation of a number within a range;
 (ii) dividing the range into a plurality of levels;
 (iii) identifying, from one of the signals, one of the plurality of levels into which the number falls;
 (v) taking the identified level to be the range;
 (vi) reiterating steps (b)(ii) and (b)(iii) until an end of the string of symbols is reached to identify a final range; and
 (vii) identifying the number from a shortest binary representation within the final range.

* * * * *